(12) United States Patent
Thomas et al.

(10) Patent No.: US 9,311,677 B2
(45) Date of Patent: *Apr. 12, 2016

(54) COMPUTER SYSTEM FOR INTERACTIONS WITH A USER DEVICE AND THIRD PARTY COMPUTERS

(71) Applicant: HARTFORD FIRE INSURANCE COMPANY, Hartford, CT (US)

(72) Inventors: Hal S. Thomas, Amston, CT (US);
Kamal D. Patel, Enfield, CT (US);
Andres Pelaez, Westfield, IN (US);
Deborah D. Sprague, Hebron, CT (US);
Jason T. Varner, Fishers, IN (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,062

(22) Filed: Jul. 15, 2014

(65) Prior Publication Data
US 2014/0330595 A1  Nov. 6, 2014

Related U.S. Application Data

(63) Continuation of application No. 13/206,964, filed on Aug. 10, 2011, now Pat. No. 8,788,297.

(51) Int. Cl.
*G06Q 40/08* (2012.01)
*G06Q 10/10* (2012.01)

(52) U.S. Cl.
CPC .............. *G06Q 40/08* (2013.01); *G06Q 10/10* (2013.01)

(58) Field of Classification Search
CPC ....... G06Q 10/00; G06Q 20/00; G06Q 30/00; G06Q 40/00

USPC .......................................................... 705/3–44
See application file for complete search history.

(56) References Cited

U.S. PATENT DOCUMENTS

| | | | |
|---|---|---|---|
| 5,504,674 A | 4/1996 | Chen et al. | |
| 5,774,883 A | 6/1998 | Andersen et al. | |
| 5,950,169 A | 9/1999 | Borghesi et al. | |
| 7,324,951 B2 | 1/2008 | Renwick et al. | |
| 7,818,187 B2 * | 10/2010 | Wahlbin et al. | 705/4 |
| 7,921,041 B1 | 4/2011 | Wolery et al. | |
| 7,953,615 B2 | 5/2011 | Aquila et al. | |
| 8,260,639 B1 | 9/2012 | Medina, III et al. | |
| 8,364,505 B1 | 1/2013 | Kane et al. | |
| 8,401,881 B2 | 3/2013 | Weinstock et al. | |

(Continued)

*Primary Examiner* — Frantzy Poinvil
(74) *Attorney, Agent, or Firm* — Howard IP Law Group, PC

(57) ABSTRACT

Described are computer systems for interactions with a user device and third party computers. In an embodiment, a computer system for determining and displaying total loss calculations includes accessing third party computer systems for a plurality of data items. The computer system may include data storage devices, computer processors, a communications device, and a memory coupled to the computer processors. The memory may store program instructions which are operative with the computer processors to provide to a user device for display a total loss calculator graphical interface, receive inputs from the user device, request data from third party computers based on the received inputs, determine whether the data needed to perform a total loss calculation has been received, and perform a total loss calculation based on the requested data from the third party computer and the user inputs received from the graphical interface provided to the user device.

23 Claims, 14 Drawing Sheets

(56) References Cited

U.S. PATENT DOCUMENTS

| | | |
|---|---|---|
| 8,527,305 B1 | 9/2013 | Hanson et al. |
| 8,731,977 B1 * | 5/2014 | Hardin et al. ............... 705/4 |
| 2003/0221118 A1 * | 11/2003 | Walker .................. 713/193 |
| 2005/0137914 A1 * | 6/2005 | Schmitter et al. ............ 705/4 |
| 2005/0267774 A1 | 12/2005 | Merritt et al. |
| 2006/0287783 A1 | 12/2006 | Walker |
| 2008/0255887 A1 | 10/2008 | Gruter |
| 2011/0213701 A1 | 9/2011 | Yolles |
| 2014/0309805 A1 * | 10/2014 | Ricci ............................ 701/1 |

* cited by examiner

COMPUTER SYSTEM FOR INTERACTIONS WITH A USER DEVICE AND THIRD PARTY COMPUTERS

CROSS-REFERENCE TO RELATED APPLICATIONS

The present application is a continuation application of copending U.S. patent application Ser. No. 13/206,964, entitled "Systems and Methods for Automobile Total Loss Calculations," filed Aug. 10, 2011, the entirety of which is incorporated herein by reference for all purposes.

FIELD

The present invention generally relates to systems, methods and apparatus for calculating a total loss amount for a vehicle involved in an accident where physical damage accounts for the total loss of the vehicle.

BACKGROUND

It can be difficult for an automobile claims adjuster to correctly determine a total loss amount for a motor vehicle that sustained physical damage in an accident because the calculations require using multiple types of data that depend on, for example, state rules and/or regulations. Each state of the United States of America has its own rules and regulations governing the threshold for recognizing a vehicle total loss, and its own tax rates that must be applied. In addition, the insurance company has its own internal insurance company guidelines. Thus, the automobile insurance claims adjusters are required to recognize and understand all of the different types of data required to arrive at a total loss amount, and are further expected to utilize up-to-date information when performing the calculations. Thus, an insurance claims adjuster may utilize a spreadsheet, for example, to accumulate the necessary data to perform the total loss calculations, and may also use multiple databases that contain state rules and/or regulations, state sales taxes, and internal insurance company guidelines. However, such data for the total loss calculations is subject to change over time, for example, as one or more states change or update vehicle total loss requirements and/or their state sales tax rates. Accordingly, there is a need for an automobile insurance total loss calculator that provides prompts for a claims adjuster to enter all the necessary data involving a particular automobile insurance accident claim, that provides current state data, insurance company data and any other required data, and that performs vehicle total loss calculations quickly and accurately.

The present inventors have recognized a need for an automated method and system that can quickly and correctly calculate total loss amounts for vehicles involved in accidents in any particular state, wherein the physical damage accounts for the total loss of the vehicle.

SUMMARY

Computer systems, methods, apparatus, and computer-readable data storage media storing instructions are disclosed for performing a vehicle total loss calculation. In an embodiment, a computer system for performing total loss calculations includes a total loss engine computer and a storage device operatively coupled to the total loss engine computer. The storage device includes a total loss application program having instructions operative to instruct the total loss engine computer to receive a valid claim number and a state selection entered on a main menu of a total loss calculator application by a user for a vehicle that has been totaled. The instructions also instruct the total loss engine computer to provide access to the user to a plurality of total loss calculator data input fields, selection buttons, and a state guidelines viewer on the main menu, to receive an instruction to calculate a total loss amount based on data entered by the user in the main menu, to determine that all required data has been entered, to calculate a net total amount for the totaled vehicle, and to provide the net total amount to the user.

In some embodiments, the instructions for calculating the net total amount may further include instructions operative to instruct the total loss engine computer to determine at least one of the net total amount in the case of the insurance company obtaining the vehicle, and the net total amount in the case of the owner retaining the vehicle. In some implementations, the instructions for providing the net total amount may include instructions operative to instruct the total loss engine computer to provide at least one of an insurance company obtains net total amount and an owner retains net total amount. The instructions may also beneficially include instructions operative to instruct the total loss engine computer to store in a memory the net total amount and at least one of the claim number, the date data is entered, the time data is entered, and an identity of the user. Some embodiments may also advantageously include instructions operative to instruct the total loss engine computer to analyze the total loss results to determine at least one of trends, inconsistencies and anomalies.

In some embodiments of the computer system, before receiving the valid claim number and state selection, instructions may be provided operative to instruct the total loss engine computer to receive a user identifier and password, determine that the user identifier and password correspond to an ordinary user with permission to access the total loss calculator application, and provide at least a portion of the main menu of the total loss calculator application. In some other embodiments, before receiving the instructions for instructing the total loss engine computer to receive the valid claim number and state selection, instructions may be provided operative to instruct the total loss engine computer to receive a user identifier and password, determine that the user identifier and password correspond to a super user with permission to access the total loss calculator application and to perform maintenance tasks, and provide a total loss calculator menu including options for accessing the main menu and for accessing at least one maintenance function menu. In addition, instructions may be provided operative to instruct the total loss engine computer to receive a selection of a maintenance function menu by the super user, provide the maintenance function menu to the super user for data input, and update total loss calculator application data based on the input and capture at least one of a date of input entry, a time of input entry, and an identity of the super user. Advantageously, the instructions for providing the maintenance function menu to the super user may include instructions operative to instruct the total loss engine computer to provide at least one of a maintain state guidelines menu, a maintain fees menu, a maintain fee rules menu, and an update user menu. In some implementations, instructions may be provided that are operative to instruct the total loss engine computer to provide at least one of vehicle rental information and vehicle purchase information.

In a further aspect, methods for providing a vehicle total loss solution are disclosed. In an embodiment, the method includes receiving, by a total loss processor, a valid claim number and a state selection entered on a main menu of a total loss calculator application by a user for a vehicle that has been totaled. The method also includes providing access to the user on the main menu to a plurality of total loss calculator data input fields, at least one selection button, and a state guidelines viewer, and receiving, by the processor, an instruction to calculate a total loss amount based on data entered by the user in the data input fields. The method further includes determining that all required data has been entered, calculating, by the total loss processor, a net total amount for the totaled vehicle, and providing the net total amount to the user.

In some embodiments, the method for calculating the net total amount may advantageously include determining at least one of the net total amount in the case of the insurance company obtaining the vehicle, and the net total amount in the case of the owner retaining the vehicle. In some implementations, the method for providing the net total amount to the user may include providing at least one of an insurance company obtains net total amount and an owner retains net total amount. Some embodiments may also beneficially include storing in a memory the net total amount and at least one of the claim number, the date data is entered, the time data is entered, and an identity of the user. The method may also include analyzing the total loss results to determine at least one of trends, inconsistencies and anomalies.

In some implementations, before receiving the valid claim number and state selection, the method may include receiving, by the total loss processor, a user identifier and password, determining that the user identifier and password correspond to an ordinary user with permission to access the total loss calculator application, and providing, on the display component, at least a portion of the main menu of the total loss application. In some embodiments, before receiving the valid claim number and state selection, the method may beneficially include receiving, by the total loss processor, a user identifier and password, determining that the user identifier and password correspond to a super user with permission to access the total loss calculator application and to perform maintenance tasks, and providing, on the display component, a total loss calculator menu including options for accessing the main menu and for accessing at least one maintenance function menu. In addition, the method may include receiving, by the total loss processor, a selection of a maintenance function menu by the super user, displaying the maintenance function menu on a display component for data input by the super user, and updating, by the total loss processor, total loss application data based on the input and at least one of a date of input entry, a time of input entry, and an identity of the super user. In some embodiments, the at least one maintenance function menu includes at least one of maintain state guidelines menu, a maintain fees menu a maintain fee rules menu, and an update user menu. Beneficially, some implementations may include providing at least one of vehicle rental information and vehicle purchase information.

In yet another aspect, disclosed is a computer readable medium storing non-transitory instructions for controlling a total loss processor, the instructions configured to cause the total loss processor to perform the method(s) for providing a vehicle total loss solution discussed above.

The total loss calculator systems, methods, apparatus and computer-readable storage media storing non-transitory instructions presented herein advantageously minimizes the risks to an insurance company concerning the processing of total loss claims because each registered user is provided with a total loss calculator the provides a universal and clear starting point for entering required vehicle total loss data, and is provided with accurate and up-to-date State guideline and tax data. Such systems, methods and apparatus also improve data accuracy and integrity, provide regulatory protection, and improve insurance claims handler response times which results in increased productivity. The increased speed and accuracy of the vehicle total loss calculations advantageously allows an insurance company to reduce costs associated with performing the total loss calculations, and to minimize the payments of fees and/or fines levied by States due to non-adherence (which is usually inadvertent) to State vehicle total loss regulations and/or State guidelines. Furthermore, the systems disclosed herein provide for simplified table and/or data maintenance tasks by, for example, a Systems Administrator or registered Super User.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

In general, and for the purposes of introducing concepts of embodiments of the present invention, a total loss calculator engine automatically calculates net total amounts associated with a vehicle that has been totaled for a registered user. Registered users may include insurance claims adjustors or appraisers, for example, who are employees of an insurance company. The users are provided with a total loss calculator main menu that may include receiving, In an embodiment, after a registered user logs in to the total loss calculator application by using his or her digital device (for example, a personal computer, a laptop computer, a mobile telephone, a personal digital assistant (PDA), a tablet computer, and the like), a total loss calculator main menu is provided. The user must enter a valid claim number and a state selection before being allowed to access to a plurality of total loss calculator data input fields, at least one selection button, and a state guidelines viewer. The user can utilize the state guidelines viewer to look up required data for input into the data fields for the total loss vehicle claim under consideration, then enters the required data and requests a total loss calculation by, for example, selecting a "calculate" button on the main menu. If all required data has been input, a total loss processor calculates a net total amount for the totaled vehicle, which may be provided to the user for the case of an insurance company obtaining the vehicle, for the case of the owner retaining the vehicle, or both. Some of the required data may be provided by third party vendors, such as by a State Tax provider, whereas other required data may be provided by the insurance company in one or more databases, for example, which are accessible by the user.

In general, as used herein the term "totaled vehicle" or "totaled car" means that a vehicle will not be repaired because the cost to repair the damage to the vehicle exceeds its "blue book" trade-in value, or a value which is determined to be the lowest possible price that a similar car (make, model and model year) is worth. For example, if a car dealer would offer $4,695 as a trade-in amount for a particular vehicle, but a body shop would require $7,000 to repair the accident damage, then an insurance company claims adjuster will have no other choice (sometimes by state law, and/or by the insurance companies' own guidelines) than to "total" the vehicle. In such a case the owner of the vehicle would be entitled to the amount of $4,695 minus an insurance deductible amount, and minus taxes, State fees, and other fees that may apply in different amounts (some of which are discussed below).

Figure 1:
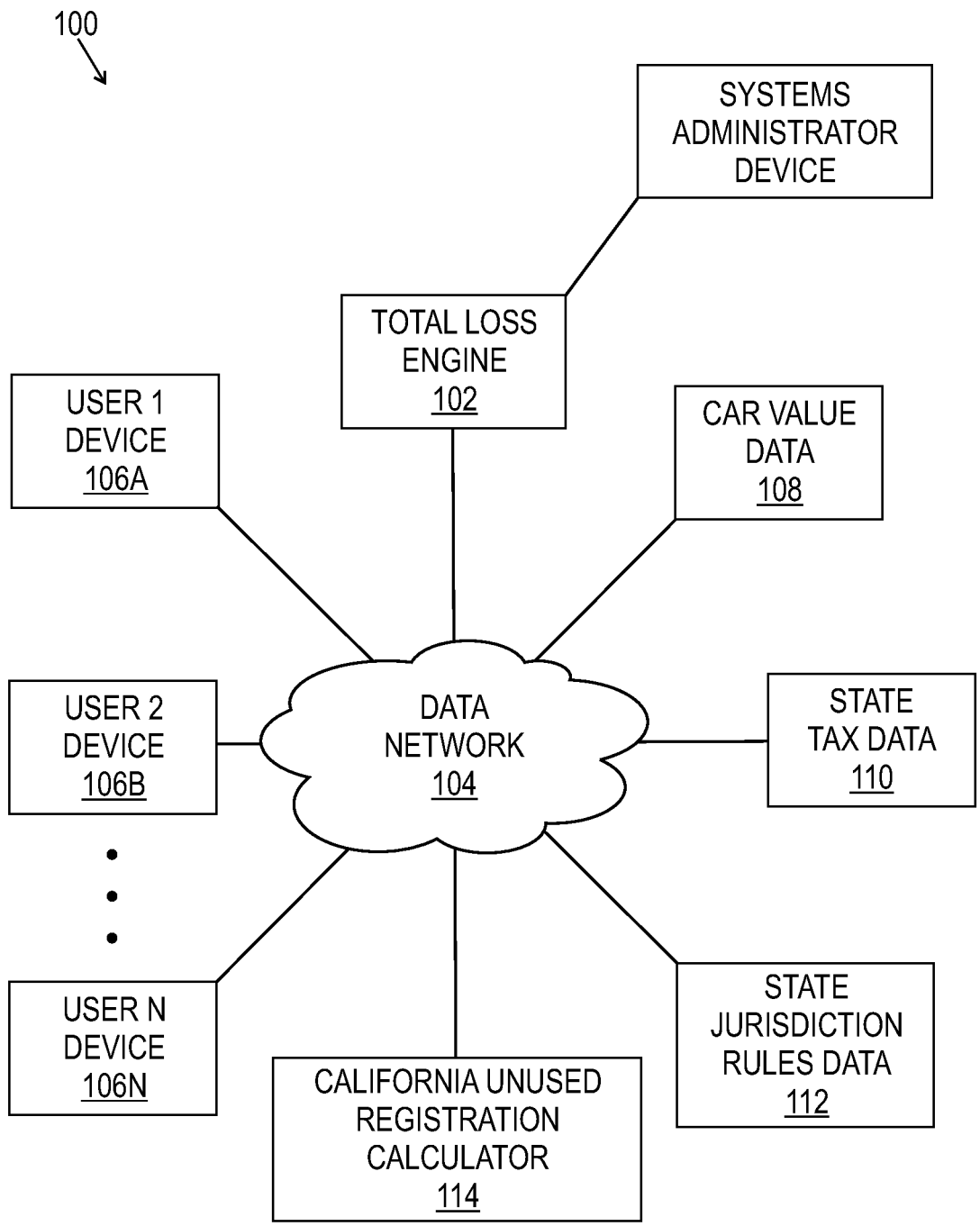
FIG. 1 is a block diagram of a system for performing vehicle total loss calculations according to an embodiment of the invention.

FIG. 1 is a block diagram of an embodiment of a vehicle total loss system 100. The total loss system 100 may include various types of digital and/or analog devices, and as shown includes a total loss engine 102 for facilitating the calculation of vehicle total loss amounts. The total loss engine 102 may be, for example, a server computer configured for communicating through a data network 104 with a plurality of User devices (User 1 device 106A, User 2 device 106B to User N device 106N), a car value data source 108, a State tax data source 110, a State Jurisdictional Rules data source 112, and a California Unused Registration Calculator 114. In some embodiments, a systems administrator device 116 is configured for direct communication with the total loss engine 102 (for security purposes), for example, to perform maintenance tasks as required. The data network 104 may be a public network (such as the internet), a private network (for example, an intranet), or a combination of public and private networks.

In some embodiments, the total loss engine 102 is a computer or computer network (including one or more computers) maintained and operated by an insurance company, and the User devices 106A to 106N may be, for example, utilized by vehicle insurance claims handlers and/or appraisers employed by the insurance company. The vehicle insurance claims handlers may utilize their devices to process both personal and commercial automobile claims. (It is also contemplated that, in some implementations, individual users other than insurance company employees may utilize portable devices to access the total loss engine 102.) In some embodiments, there may be 1,500 or more users of the total loss engine 102 who may be organized, for example, in three or more company insurance claims centers, wherein each claim center can process several hundred vehicle accident claims per month. The User devices 106A to 106N may communicate via the data network 104 with the total loss engine to utilize a total loss application to determine a total loss amount for a particular vehicle registered in a particular state. During a data gathering process, the total loss engine 102 may communicate with a Car Value data source computer 108, a state tax data source computer 110, the State Jurisdiction rules data source computer 112, and the California Unused Registration calculator 114 via the data network 104. More specifically, the total loss engine 102 may request car value data from the car value data source computer 108 that concerns, for example, the value (for example, in U.S. dollars) of a particular make and model-year automobile that has been recently sold in a specific State or region. In addition, the total loss engine 102 may request State tax data from the State tax data source computer 110 that may concern, for example, current State taxes concerning a vehicle accident claim originating from a particular state. The total loss engine may also request data from the State Jurisdiction Rules data source computer 112 concerning totaled vehicles. In some embodiments, the total loss engine 102 provides a link to the California Unused Registration calculator 114 for users to utilize when the totaled vehicle was registered in California.

Figure 2:
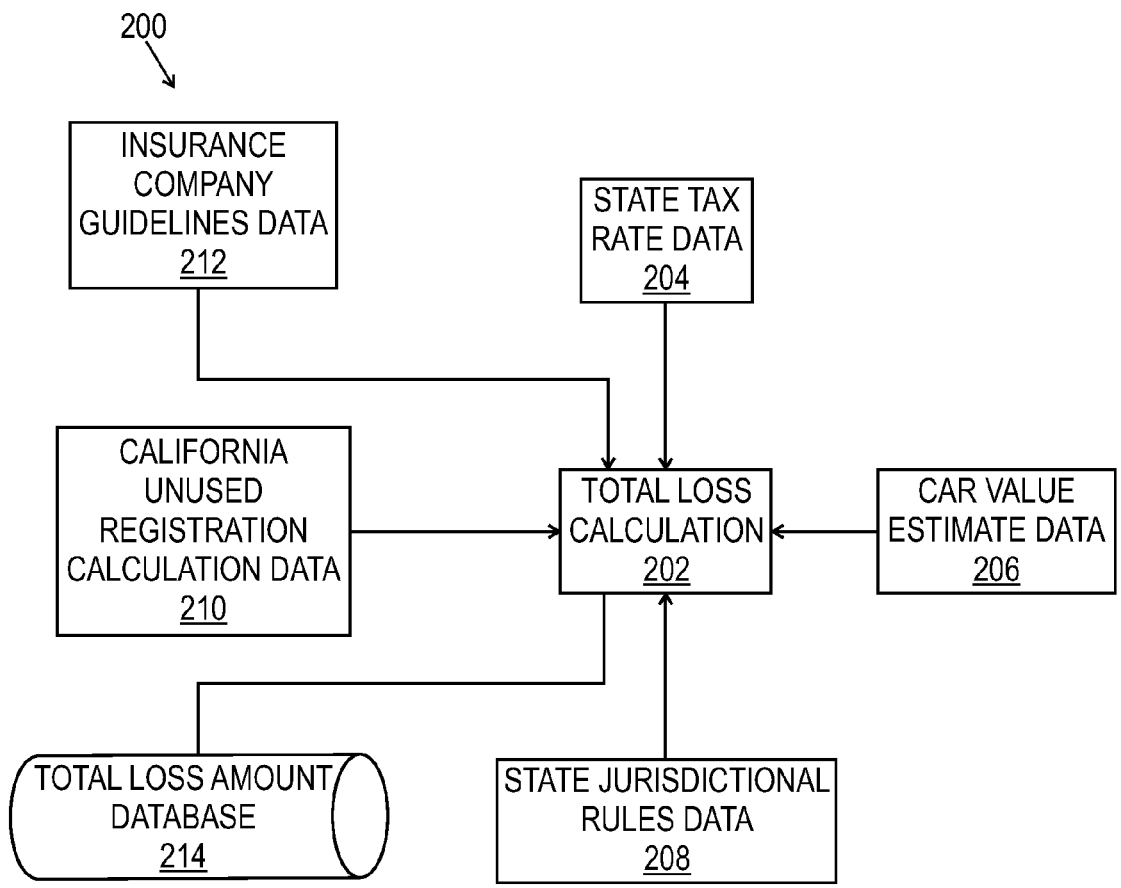
FIG. 2 illustrates data flows involved in generating a vehicle total loss amount in accordance with aspects of the invention.

FIG. 2 is a block diagram 200 illustrating the data flows involved in the calculation of a total loss amount resulting from a vehicle accident insurance claim wherein the physical damage to the car accounts for the total loss of the vehicle. In the embodiment illustrated by FIG. 2, the total loss calculation 202 depends on at least three types of information: (1) State tax rate data (block 204); (2) car value estimate data (block 206); and (3) State jurisdictional rules data (block 208) of State rules that apply when a vehicle involved in an accident is considered to be a total loss. In addition, for cases involving a totaled vehicle registered in the State of California, a "California unused registration amount" must be calculated, and thus a California unused registration data calculation (block 210) is performed. In some embodiments, also included are insurance company guidelines and/or rules data (block 212) which are also utilized to determine a vehicle total loss amount. Also shown is a total loss amount database 214 for storing data from users of the total loss engine concerning the calculated vehicle total loss amounts?

In some embodiments, the State tax rates data and/or the State regulations data and/or the car value estimate data are provided by outside vendors of the insurance company. Since such data is subject to change, the outside vendors are responsible for providing current and accurate State tax rates and State regulations concerning totaled vehicles for each state of the United States, and for providing current and accurate vehicle value estimates based on current prices for a particular make, model type and model year of automobile. For example, the source of the State tax rate data 204 may be, for example, a company such as Vertex Incorporated of Berwyn, Pa., which provides tax data to businesses for compliance and other purposes. The source of car value estimate data 206 may be, for example, the Kelley Blue Book Company, or Edmunds.com, or CCC Information Services, Incorporated (or some combination of data from such companies). In some other embodiments, an insurance company may gather, utilize and store such data in one or more proprietary databases for internal use only.

Figure 3:
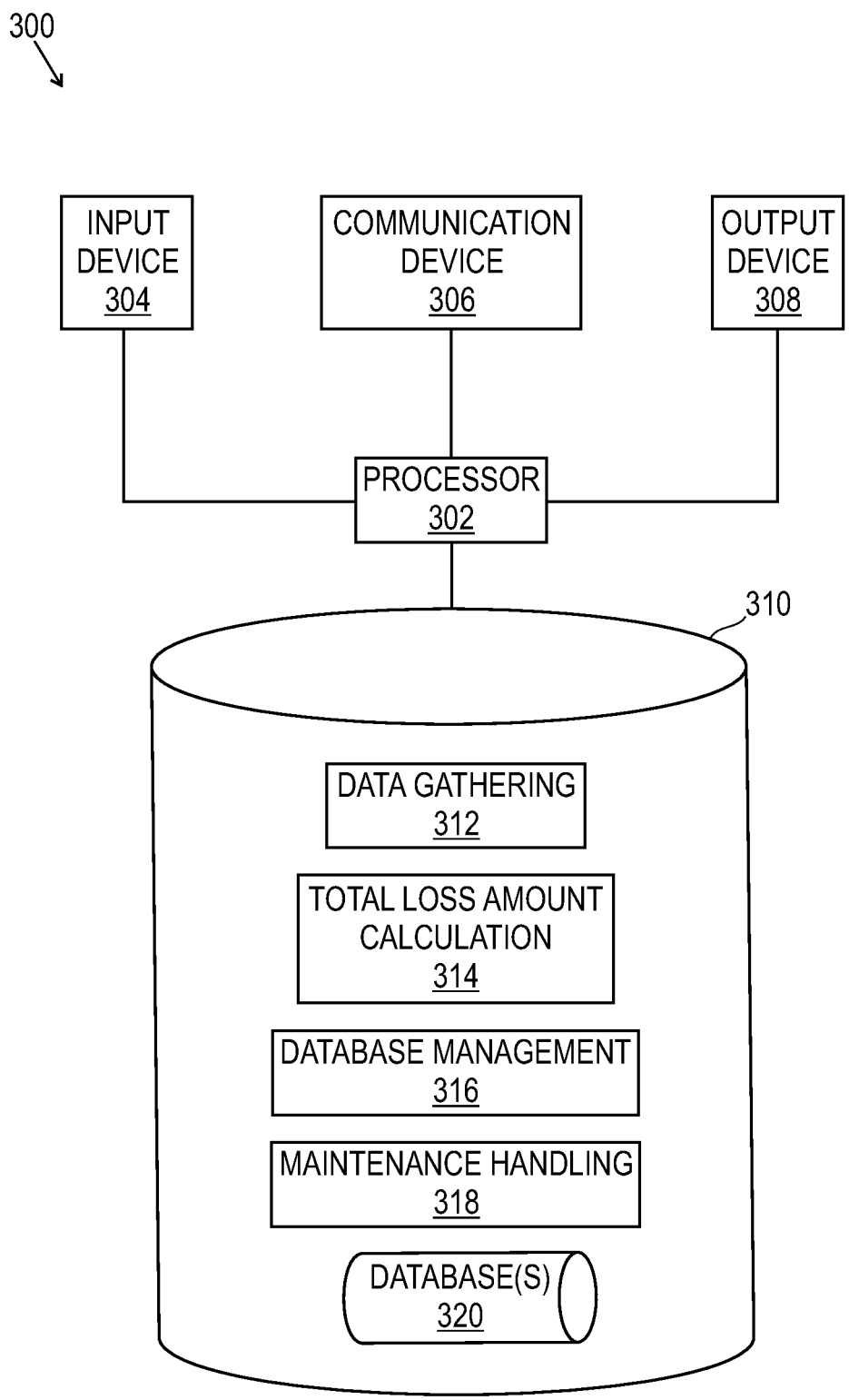
FIG. 3 is a block diagram representation of a computer that may embody aspects according to the invention of the total loss engine shown in FIG. 1.

FIG. 3 is a block diagram representation of an embodiment of a total loss engine computer 300 that may embody aspects of the total loss engine 102. As shown, the total loss engine computer 300 includes a processor 302 that is operatively coupled to one or more input devices 304, a communication device 306, one or more output devices 308, and a storage device 310.

Communication device 306 may be used to facilitate communication with, for example, the data network 104 (FIG. 1)

and/or with other devices (such as User devices 106A to 106N, which may be handheld devices and/or mobile devices and/or computers operated). In some embodiments, the communications device 306 wirelessly transmits data to, and wirelessly receives data from, the user devices. Again referring to FIG. 3, the input device(s) 304 may comprise, for example, a keyboard, a keypad, a mouse or other pointing device, a microphone, knob or a switch, an infra-red (IR) port, a docking station, and/or a touch screen. The input device(s) 304 may be used, for example, to enter information. Output device(s) 308 may comprise, for example, a display (e.g., a display screen), a speaker, and/or a printer.

Storage device 310 may comprise any appropriate information storage device, including combinations of magnetic storage devices (e.g., magnetic tape and hard disk drives), optical storage devices, and/or semiconductor memory devices such as Random Access Memory (RAM) devices, Read Only Memory (ROM) devices, and Flash Memory devices. At least some of these devices may be considered a computer readable medium and/or computer-readable storage media, or may include such media.

In some embodiments, the hardware aspects of the total loss engine computer 300 may be entirely conventional.

Storage device 310 stores one or more programs, program modules and/or applications, or portions of programs, program modules or applications (at least some of which being indicated by blocks 312-316) for controlling processor 302. The programs and/or applications include instructions for directing the processor 302 to perform tasks, and thereby to operate in accordance with aspects of the methods disclosed herein. In some embodiments, the programs may include a program, program module or application 312 that instructs the computer 300 to receive, request and/or gather various types of data (see data 204, 206, 208, 210 and 212 of FIG. 2) from various sources that is required to perform a total loss calculation for a particular totaled vehicle according to the aspects described herein.

Another program, program module or application stored on the storage device 310 is indicated at block 314 and is operative to program the total loss computer 300 to calculate a total loss amount for a particular vehicle. Programs 312 and 314 are provided in accordance with novel aspects described herein.

Still another program or program module or application stored on the storage device 310 is indicated at block 316. Program 316 may be a conventional database management program, and may be provided to allow a user to store data and to access data in the total loss amount database 214, and/or to transmit data to or obtain data from other databases stored in the storage device 310.

Continuing to refer to FIG. 3, storage device 310 also stores an application or a program/program module 318, which operates to control the total loss computer 300 to receive, handle and respond to requests from System Administrators and/or Super Users for performing maintenance activities, such as updating and/or changing user profile data, State tax data, State guidelines data, and the like.

It should be understood that a vehicle total loss engine computer 300 may, in some embodiments, lack one or more of the application programs shown in FIG. 3. Also, in accordance with some embodiments, the vehicle total loss engine computer may include additional functions that are not illustrated in FIG. 3.

There may also be stored in the storage device 310 other programs, program modules, applications and/or software, such as one or more conventional operating systems, device drivers, communications software, website hosting software, and the like that may be required to function correctly with other devices, for example.

Still further, the storage device 310 may store the total loss amount database 214 and one or more other databases, such as a user database, utilized by the total loss computer 300. Such databases are illustrated in FIG. 3 as database(s) block 320.

Figure 4A:
FIGS. 4A to 4C illustrate screen shots of a vehicle total loss calculator main menu, a Lien Holder pop-up menu, and a Tax pop-up menu, respectively, according to aspects of the invention.
Figure 4B:
Figure 4C:

FIGS. 4A to 4C illustrate screen shots of a vehicle total loss calculator main menu 400, a Lien Holder pop-up menu 420, and a Tax pop-up menu 492, respectively, according to aspects of the invention.

FIG. 4A illustrates an embodiment of a total loss calculator graphical user interface (GUI) main screen 400 that is provided to a user after the user logs in to the total loss calculator application. The total loss calculator application permits users to calculate a total loss amount in the case where the insurance company retains the property (i.e., the insurance company takes ownership of the damaged automobile), in the case where the owner retains the property (the owner keeps the damaged car), and for both scenarios. Thus, an insurance claims adjuster utilizes the total loss application to enter data required to perform both types of calculations and then clicks on the "Calculate" button 430 (as described below) to obtain Net Totals 456 and 457 for both cases.

It should be understood that, in some embodiments, users must first be registered as valid users in the total loss application for security purposes. Accordingly, in some implementations a user profile must exist in a total loss engine database accessible by the total loss engine computer 300 before that user can utilize the total loss application. (The insurance company can thus restrict access to only those users/employees who need to utilize the total loss calculator engine.) Registration of users may be handled, for example, by a designated employee of the insurance company, such as a "System Administrator" or a "Super User". An insurance company may strictly limit the number of persons/employees who have System Administrator and/or Super User status so that changes and/or updates can be easily traced for system integrity and security purposes.

In some embodiments, registered users can access the total loss calculator application by using a web browser (such as Internet Explorer™ 6.0 or later, Google Chrome™, Firefox™ and the like) and by typing in a uniform resource locator (URL). In some embodiments, the user (for example, an auto claims adjuster employed by the insurance company) logs into the company network system and then accesses the total loss calculator application via a link provided on an insurance company "Links" menu (not shown). Alternately, a user may be able to utilize a web browser and type in a URL of a secure website (for example, maintained by the insurance company) hosting the total loss application, wherein the website requires the user to first enter an employee identifier and password (or PIN or other personal access code) for security purposes before providing access to the total loss application main screen 400.

In some embodiments, when the system authenticates a User identifier (ID) it also determines that user's role within the application. For example, users may be distinguished as ordinary users, System administrators and/or Super-users, wherein each type of user can have different levels of access to aspects of the total loss application. In some implementations, a System Administrator may be able to maintain a database of ordinary users (i.e., add users, delete users, and/or change user information), while Super Users may be able to do that and more. For example, a Super User may be able to maintain ordinary user profile data and be responsible for maintaining data concerning fees, taxes and guidelines for the total loss system. If an entered User ID does not match any stored user profiles, then the system may display a message such as: "Your ID could not be authenticated as a valid user of this application. Please contact your supervisor for access" or the like.

Referring again to FIG. 4A, the steps required to perform a total loss calculation according to an embodiment will now be described. The user initiates the total loss calculation by entering a claim number in field 402 and clicking on a "Validate" button 403. In some embodiments, the claim number must be a valid insurance company claim number that is typically centrally issued and stored in a claim number database. The claim number must be a predefined combination of letters, numbers and/or special characters defined by, for example, the insurance company. If the claim number entered by the user fails validation then the user may be prompted to "Please enter a valid Claim Number" before proceeding. If the claim number is valid then the claim number field is disabled so that no editing can occur (in some embodiments, the claim number field is "grayed out" to provide a visual cue to the user that the claim number cannot be edited/changed), and the State field 404 is enabled. In some embodiments, a drop-down menu (or some other type of menu) is provided for the user to select a listed State, and if the user does not select one within a predetermined time (or if she tries to click on some other portion of the menu) then he or she may be prompted to "Please select State". Once the State is selected, then the system enables the other fields on the main screen for user entry of information.

Referring again to FIG. 4A, in this example the user has selected the owner of the loss vehicle to be an insured 406 and the system displays the Deductible field 408. (If the "Claimant" were selected instead, then an "Insured Comparative Negligence" field (not shown) would be displayed and the user would enter a percentage from 0% to 100%. In this case, if the user leaves the "Insured Comparative Negligence" field blank or enters a number greater than 100, then the system will warn the user to "Please enter a valid Insured Comparative Negligence percentage".) Next, the user enters the deductible amount in the deductible filed 408, which information comes from the insured's policy. In some embodiments, the deductible amount must be in increments of fifty dollars, and if an entry is non-conforming then a message is displayed stating "You have entered a deductible amount that is not in an increment of $50" with an "Ok" button (so that the user can either change the entry or leave it as is). In the example shown in FIG. 4A, the user selected 'No' for the 'Leased' option field 410, and selected "Yes" for the Lien Holder option field 412 for the vehicle in question. Thus, the vehicle was not leased and there is a Lien Holder (which typically means that the owner took out a car loan that has not yet been fully paid).

FIG. 4B shows a prompt box 420 that is displayed for the user when the "Yes" radio button 412 (FIG. 4A) is selected, so that the user can enter Lien Holder details. In particular, the user is presented with a Lien Holder name field 422, Lien Holder phone number field 424 and Lien Holder account field 426, which fields are optional. The user can use these fields to view and/or to update the Lien Holder information if she wishes, and then click on "Save" 427 or "Cancel" 428.

Referring again to FIG. 4A, the user next enters an amount in the total loss vehicle's Actual Cash Value (ACV) amount field. The ACV amount may be supplied by, for example, a third party vendor or vendors, or in some embodiments may be found in a database of vehicle cash value data that may be maintained by the insurance company, or that could be generated from multiple sources. The user then may enter an amount in the Unrelated Prior Damage (UPD) field 416, if applicable (if no amount is entered for the UPD then the system defaults to zero), and if a UPD amount is entered then the net ACV (which is the ACV minus the UPD) is calculated. The system checks the ACV amount (or the net ACV amount) against the State's "basic transportation limit" amount to determine whether or not to replace the entered number with the basic transportation limit amount (which must be used as the minimum amount according to some State regulations). If the entered amount is replaced, in some embodiments an "OK" button is displayed (not shown) to the user for acknowledgement of the change. The user then enters an amount in the Salvage Value field that will be used for "Owner Retains" calculations. The user can now click on the "Calculate" button 430, but if any data is missing (for example, the deductible field is blank) then she will be prompted to enter the missing data. The user may click on the "Clear" button 432 instead, and if so then all user entries and calculations up to that point are cleared from the screen, the claim number field is enabled and the other fields are disabled. In other words, hitting the "Clear" button 432 resets the main screen 400.

Turning now to the case described above wherein the user has entered all of the required data and clicked on the "Calculate" button, the system captures the date, the time and the identity of the current user, and calculates the total loss amount. If the user wants to then copy the results, she clicks on the "Copy" button 434. Similarly, if the user wishes to print the results, she clicks on the "Print" button 436.

FIG. 4C illustrates a prompt box 490 that is displayed for the user when the user selected a State (here, "North Carolina") that requires an additional tax and/or fee to be applied before the overall total loss calculation can be made. An explanation field 492 is displayed so that the user can provide an amount in the provided box 494 (in the example of FIG. 4C, a "maximum limit" amount is required that is a sales tax of 3% on the ACV with a maximum amount of $1500). In this example, the user checks the ACV, performs the calculation according to the guidelines, and enters the amount in box 490, then clicks on the "Save" button 496. If, however, the user determines that an amount is not required then she can click the "close" button instead.

In some cases, the user may wish to review the tax details and may do so by clicking on the "View Tax" link 438 or 440 (depending on whether the Insurance company obtains the vehicle, or if the owner retains the vehicle) to display the current Tax guidelines, details, and the calculations in a pop-up tax window (not shown). In some embodiments, the user can copy or print the tax calculations displayed in the pop-up tax window. The user then clicks on a "Close" button (not shown) to exit the pop-up tax window.

The user also has the option to review the fees by clicking on the "View Fee" link 442 or 444 (depending on whether the Insurance company obtains the vehicle, or if the owner retains the vehicle) to display the current Fee guidelines, details, and the calculations in a pop-up fee window (not shown). In some embodiments, the user can copy or print the fee calculations displayed in the pop-up fee window. The user then clicks on a "Close" button (not shown) to exit the pop-up fee window.

In some embodiments, a user can click on an "Input Additional Comments" link 446 to enter typewritten comments in a pop-up comment window (not shown) displayed on the screen. The user can enter comments and then has the choice to click on a "Save" button, a "Clear" button, or a "Cancel" button (not shown). In some embodiments, this ends the basic flow of information for a total loss calculation.

The following describes the behavior of the system when the user initiates a calculation. As described above, the user enters all necessary data for calculating a total loss amount in the fields of the main screen 400 and then clicks the Calculate button 430. A pop-up Tax Rate window (not shown) is displayed prompting the user to enter a Tax Rate for the selected State, and also displayed are the Tax guidelines for that State. After inputting the tax rate, the user saves the entry. Next, a pop-up State Fees window (not shown) is displayed prompting the user to enter State Fees for the selected State, and also displayed are the Fees guidelines for that State. The user then saves the State Fees entry. The system then calculates the "Net Total" for both the "Insurance Company Obtains" option 450 and the "Owner Retains" option 460, and the results for both options are displayed for the user on the screen.

In particular, referring to FIG. 4A, for the "Insurance Company Obtains" option 450, the system calculates the "Net ACV" 451, the "Sales Tax" 452 (wherein the total tax amount is equal to the Net ACV multiplied by the applicable State tax percentage), the "Total Fees" 453 (which varies from State to State, as explained below), the "Sub-Total" 454 (which is the amount owed to the owner of the loss vehicle before considering the deductible or the insured comparative negligence, if applicable), and the "Net Total" 456 (which is the net amount owed to the owner of the total loss vehicle). The total loss application then populates these fields with monetary amounts. In addition, the "Deductible" amount 455 is carried over from the amount entered in the "Deductible" field 408 by the user. In the "Insurance Company Obtains" case, the net total 456 equals the net actual cash value 451 plus the sales tax 452 (if applicable) plus the total fees 453 (if applicable) minus the deductible amount 455. State tax and fees may or may not apply based on individual State guidelines, and this also depends on the selection for Insured/Claimant, on whether the vehicle was leased or not leased, and if there is a Lien Holder or not. In the case where the insurance company obtains for the claimant, the net total 456 equals the insured's comparative negligence percentage (not shown) times the sum of the net actual cash value 451 plus the sales tax 452 (if applicable) plus the total fees 453 (if applicable).

In the case of the "Owner Retains" option 460, the system calculates the "Net ACV" 461, the "Sales Tax" 462, the "Total Fees" 463, the "Sub-Total" 465 (which is the amount owed to the owner of the loss vehicle before considering the deductible or the insured comparative negligence, if applicable), and the "Net Total" 467 (which is the net amount owed to the owner of the total loss vehicle) and populates these fields with monetary amounts. The "Salvage Value" amount 464 and the "Deductible" amount 466 are carried over, respectively, from the amount entered in the "Salvage Value" field 418 and the "Deductible" field 408 as entered by the user. The "Net ACV" 451, which is the actual cash value of the vehicle minus the unrelated prior damage amount (if any), cannot be less than the "basic transportation" amount (which is set by the selected State). For example, the "State of A" set the threshold for basic transportation at 250 dollars so even if the actual cash value (ACV) for the totaled vehicle is only 100 dollars (for example, because it is a twenty-five year old car), then the minimum amount that the insurance company must pay to the vehicle owner is 250 dollars.

In the case where the Owner Retains 460, the net total 467 equals the net actual cash value 461 plus the sales tax 462 (if applicable), plus the total fees 463 (if applicable) minus the salvage value 464 minus the deductible 466. State tax and fees may or may not apply based on individual State guidelines, and depends on the selection for Insured/Claimant, whether the vehicle was leased or not leased, and if there is a Lien Holder or not. When the owner retains the vehicle for the claimant, then the net total equals 467 the insured's comparative negligence percentage (not shown) times the sum of the net actual cash value 461 plus the sales tax 462 (if applicable) plus the total fees 463 (if applicable) minus the salvage value 464.

The Total Fees calculation (for both the "Insurance Co. Obtains" and the "Owner Retains" cases) involves adding all of the applicable fees. In particular, different fees apply for each State of the United States. Examples of fees that may be required include, but are not necessarily limited to, Title Fees, Title Processing Fees, Light Vehicle Title Fee, New Title and Plate Fee, Transfer Fee, Unused Registration fee, Salvage Title Certificate fee, Full License fee, Total Fees by Name (which equals the number of names on the title times the fees), and Total Fees by Lien (which equals the number of liens times the fees per lien). Adding to the complexity of arriving at a Total Fees amount is the fact that the names of the fees can vary from one State to another State, and thus in some embodiments such name changes are incorporated in the total loss application. In addition, in some States the fees (and/or State taxes) may or may not apply depending on state guidelines concerning whether the user selected Insurance Company Obtains or Owner Retains, and/or if the car was Leased or not, and/or whether there is a vehicle Lien Holder or not.

The user's entries and the calculated results are saved for the claim number entered by the user when he or she initiated the total loss calculator application. These entries and results can thus be accessed again at a later time by a user entering that same claim number, and then updating and/or editing fields as desired. In some embodiments, a copy of the original total loss calculation along with further information, such as the name or user ID of the user who filled out the forms, the date and the time, is stored in a memory along with one or more further editions or total loss results for that claim number.

Referring again to FIG. 4A, a State Guidelines viewer 470 is provided on the main screen 400 to enable a user to easily find required State Guideline information concerning a claim. The State Guidelines viewer 470 is enabled for use after the user has selected a State 404, and for the selected State displays a Threshold button 471, a Tax button 472, a Letter button 473, a Title Information button 474, a Title Fees button 475, a Paperwork button 476, an Owner Retains button 477, and an Original Lien button 478. The user selects a topic and then clicks on the requisite button to obtain information. In some embodiments, a pop-up window (not shown) containing the requested guidelines and/or data is displayed to the user in a "read-only" format. When the user clicks on a 'Close' button (not shown) or the like on the pop-up window, he or she is returned to the main screen 400. In some embodiments, instead of a pop-up window another, new window may be opened to display the requested information.

Again referring to the State Guidelines viewer 470, also provided is a "Compliance Map" link 480 that the user may click on to navigate to the Total Loss compliance website for the selected State, and in some embodiments the text for the link is configurable. In some implementations, the compliance map link 480 opens a new window that shows a map of the United States, and the user clicks on the State in which the vehicle is registered to view the compliance guidelines for that State.

Also shown in the State Guidelines viewer 470 is a "California Unused Registration Worksheet" line 482 which will open that worksheet in a new window. Thus, when the total loss calculation involves an automobile registered in California, the user will be required, in some embodiments, to open this worksheet and determine an amount to enter because there is no direct integration with the Total Loss Calculator application.

In some embodiments, when the user desires to make a copy of the total loss data and calculations, he or she clicks on the "Copy" button 432 and is presented with a copy pop-up menu (not shown) that includes prompts for the user to choose the data and the calculations for either the "Insurance Company Obtains" case, or the "Owner Retains" case, or "Both" cases. In addition, in some embodiments the copy pop-up menu may include additional prompts for one or more of the Sales Tax calculations, the Fees calculations, and/or the additional comments, for the user to select. A second "copy" button may be provided in the copy pop-up menu along with a "clear" button (that can be selected if the user wishes to clear all of the selections and make new ones, or changes her mind and now does not wish to make any copies). Once the second copy button is selected, the system copies the user entries, the selected calculations and any other chosen information to the clipboard application of the computer. The user can insert the copied data into a report or other document. In some implementations, each included copied section will be separated by a suitable header, for example:

"Total Loss Calculations for 'State Name'—Insurance Company Obtains"

"Total Loss Calculations for 'State Name'—Owner Retains"

"Sales Tax Calculations for 'State Name'—Insurance Company Obtains"

"Sales Tax Calculations for 'State Name'—Owner Retains"

"Fee Calculations for 'State Name'—Insurance Company Obtains"

"Fee Calculations for 'State Name'—Owner Retains"

"Additional Comments"

Referring again to FIG. 4A, in some embodiments, when the user desires to print out a copy of the total loss calculations, he or she clicks on the "Print" button 436 and is presented with a print pop-up menu (not shown) that prompts the user to choose to print either the data and calculations for the "Insurance Company Obtains" case, or for the "Owner Retains" case, or for "Both" cases. In addition, in some embodiments the print pop-up menu may include prompts for the user to select to also print the Sales Tax calculations, the Fees calculations, and/or the additional comments section. A second "print" button may be provided in the print pop-up menu along with a "clear" button (that can be selected if the user changes her mind regarding the items she wishes to print). Once the second print button is selected, the system transmits the selected items selected by the user to a printer for printing. In some implementations, each printed section will be separated by a suitable header, such as those described in the immediately preceding paragraph above.

In some embodiments, access to certain functions of the total loss application is restricted based on a user-type and/or based on a user role. FIGS. 5A to 5E illustrate display screens that can be accessed by users designated as "Super Users" to perform functions such as maintaining State Guidelines, maintaining State Fees and Fee rules, maintaining/updating State Tax rates, and maintaining (adding or deleting) ordinary users in the total loss application.

Figure 5A:
FIGS. 5A to 5E illustrate screen shots of vehicle total loss calculator maintenance menus for use by, for example, a Super User to update State guidelines, Fees and Users according to aspects of the invention.

FIG. 5A illustrates a total loss calculator application "Maintain State Guidelines" display screen 500 that can be accessed by a Super User (after he or she has logged into the total loss calculator application) to view and/or modify the State Guidelines for the total loss application. In this example, the selected State 502 is "California" and a "Guidelines" tab 504 has been selected so that an "Update State Guidelines" sub-menu 503 is displayed that includes various text entry boxes. In particular, text input boxes are shown for entering California State data for a Tax amount 506; a vehicle Threshold amount 508 regarding when a vehicle is considered to be "totaled"; Letter requirements 510 (if any, for example, the State Attorney General's office "must receive a letter signed by an insurance company agent detailing the settlement amount by first class mail within thirty days of settlement", or must receive an email, or the like); Title Information 512; Title Fees 514; State Paperwork requirements 516 (if any); Owner Retains rules 518; and Original Lien information 520 (if applicable). The Super User can utilize the "Maintain Guidelines" menu 500 to modify or update the State guidelines and then click on the Save button 522 to save any change(s) to the total loss system. In some embodiments, the total loss system captures and stores the date and/or time of the updates and the identity of the current Super User in a memory. Alternately, if the Super User wishes to discard the changes he or she can click on the "Cancel" button 524.

Figure 5B:

FIG. 5B illustrates an implementation of a "Maintain State Guidelines" menu 530 for use by the Super User after selecting the State 502 (in this example, "California") and clicking on the "Website and Threshold" tab 532. The State Guidelines Website sub-menu 534 includes various text entry boxes including a Display Name field 536 and a Website field 538 for updating the link to the State Compliance website for Total Loss. Some States (such as California) provide tools that can be used to calculate specific amounts required by that State, and as shown in FIG. 5B the menu 500 includes a Display Name field 540 for use by the Super User to enter a tool name so that, when an ordinary user of the total loss application is working on a total loss calculation, he or she can use the tool for a total loss calculation for a vehicle registered in that State. The Super User may also enter a link to that tool in the Website field 542. In some implementations, the Super User also views and/or updates the link to the Compliance website for the Basic Transportation limit (if applicable in that State) by selecting the checkbox 544 and entering the amount in the basic transportation limit amount field 546. In the example shown in FIG. 5B, the Limit for Basing Transportation applies (the box has been checked) and the limit amount entered in the limit amount field 546 is $500 (five hundred dollars). The Super User then clicks on the "Save" button 548 to save any change(s), and the system captures and stores the date and/or time of the updates and the identity of the current Super User in a memory. Alternately, if the Super User wishes to discard the changes he or she can click on the "Cancel" button 550.

Figure 5C:

FIG. 5C illustrates an implementation of a "Fee Rules Maintenance" menu 552 for use by the Super User after selecting the State 502 (in this example, "Connecticut") and clicking on the "Fees" tab 554. Because the number of fees, the fee names, the fee amounts and the fee rules vary from State to State, the menu permits Super Users to enter Fee Names that will be displayed to ordinary users, to check boxes indicating that the fee applies (and may require user input), and to enter fee amounts (when applicable) for both the "Insurance Company Obtains" and the "Owner Obtains" cases. In the example shown in FIG. 5C, a "Display Name" column 556 includes ten (10) text entry fields so that a Super User can enter State fees for up to ten (10) possible fees per State. As shown, the names "Title Fee", "Title Processing Fee", "Light Vehicle Title Fee", "New Title & Plate Fee", "Transfer Fee", "Unused Registration Fee", "Salvage Title Certificate Fee", and "Full License Fee" have been entered. In addition, the "Insurance Co. Obtains" column 558 and the "Owner Retains" column 560 each contains, for each row corresponding to a particular State Fee, an "Applies" check box, a "User Input" check box, and a Fee Amount data entry field. Referring to the "Fee 1" row 562, which is the Title Fee, the Super User has checked the box "Applies" under the Insurance Company Obtains column 558 and entered a fee amount of $36. Thus, when an ordinary user uses the total loss application for a vehicle registered in Connecticut, this fee will appear when calculating the total loss amount for a vehicle for the case of "Insurance Company Obtains". This fee amount does not apply in the "Owner Retains" case because the Super User has not checked the "Applies" box in the Owner Retains column 560. Continuing with this example, in the Fee 2 row 564 the "Title Processing Fee" only applies in the "Owner Retains" case, and the fee is $50. With regard to Fee 4 row 566, the "New Title & Plate Fee" only applies in the "Insurance Co. Obtains" case, and requires user input. Thus, for this case, an ordinary user would be prompted, during the total loss calculation, to enter the new plate and title fee (which the user can find by using the State Guidelines Viewer 470 explained above with regard to FIG. 4A). Regarding the "Fee 5" row 568, the "Transfer Fee" applies in both the "Insurance Co. Obtains" and the "Owner Retains" cases, and the fee is $20. The "Fee 7" row 570 illustrates a case where a fee, here the "Salvage Title Certificate", applies in both the "Insurance Co. Obtains" and the "Owner Retains" cases, and wherein this fee requires user input in both cases. The Super User then clicks on the "Save" button 569 to save any change(s), and the system captures and stores the date and/or time of the updates and the identity of the current Super User in a memory. Alternately, if the Super User wishes to discard the changes he or she can click on the "Cancel" button 571.

Figure 5D:

FIG. 5D illustrates an implementation of a "Fee Rules Maintenance" menu 572 for use by the Super User after selecting the State 502 (continuing with this example, "Connecticut") and clicking on the "Fee Rules" tab 574. The menu 572 permits a Super User to specify the Fee Rules for each State by selecting checkboxes for each case where the Fee will be included in the Total Loss calculations. In this implementation, there are sixteen possible permutations based on the combinations of the following parameters: whether the Insurance Co. Obtains or the Owner Obtains, whether the calculation is for the Insured pr the Claimant, whether or not there is a Lien Holder, and whether or not there is a Lease. For the cases where a checkbox is selected, the total loss system will include the calculated total Fee Amount in the Total Loss calculation. Alternately, where a check box is not selected for a particular case, the Fees will not be included in the calculations for Net ACV. When finished with updates, the Super User clicks on the "Save" button 576 to save any change(s), and the system captures and stores the date and/or time of the updates and the identity of the current Super User in a memory. Alternately, if the Super User wishes to discard the changes he or she can click on the "Cancel" button 578.

Figure 5E:

In some embodiments, a Super User is responsible for maintaining the users on the system by adding users, maintaining user profile data, and for deleting users from the system (for example, when a user is terminated from employment). FIG. 5E illustrates an implementation of a "Maintain Users" menu 580 for use by the Super User. In this example, the Super User has already entered his login ID 582 and has entered information for an ordinary user "John M. Hart" in the first name, middle initial, and last name text boxes 584, 586 and 588. Also entered is an Office identifier in Office text box 590 and John Hart's role as a Super User in Role text box 592. Once the Super User clicks on "Save" 594, and assuming the John Hart is a new user, the system will validate that the data is for a newly added user and does not match an existing profile. The system then saves the new profile and captures the date and time of creation of the new user in the system along with the identity of the current Super User. In some embodiments, the system then returns to a blank User Maintenance screen 580 and displays a message: "New User Added Successfully". The system also captures and stores the date and/or time of the updates and the identity of the current Super User in a memory. Alternately, if the Super User wishes to discard the entries that were made, he or she can click on the "Cancel" button 596 and in some embodiments the system will return to a blank User Maintenance screen 580 and display the message: "Changes to User Profile Not Saved".

In the case where John M. Hart is not a new user, but his profile needs updating, the Maintain Users screen 580 permits a Super User to make such changes. For example, if John Hart moved to another office location within the insurance company, then the Super User can edit the office box 590 by selecting the new office from a drop-down menu (not shown) and then click on the Update button 594 to save that change. Alternately, if John Hart is leaving his employment with the insurance company, then the Super User can enter a date of termination in the "Termination Date" filed 598 by selecting it on a drop-down menu (not shown) and clicking on the Update button 594. Whenever any of such information is updated, the system displays a message "User Profile Updated Successfully" and captures and stores the date and/or time of the updates and the identity of the current Super User in a memory.

The processes described above therefore permit Super Users to maintain and update information without technical intervention. In addition, ordinary users are able to copy and paste their calculation results into the claim system notes (which is, in some embodiments, associated with the claim number), and to print the results of total loss calculations in a user-friendly format. In some embodiments, the system saves total loss calculation data for each vehicle claim number in a central database so that such data can be retrieved and/or utilized for various purposes. For example, total loss calculation data can be retrieved by State, claim center, or some other characteristic for study and or analysis by users. In another example, the stored total loss application data for users associated with a particular claims center may be analyzed to spot trends and/or inconsistencies and/or anomalies when compared to total loss application data entered by users from another claims center. In some embodiments, only authorized persons, such as Super Users, may be permitted to perform searches and analyze the total loss data.

Figure 6:
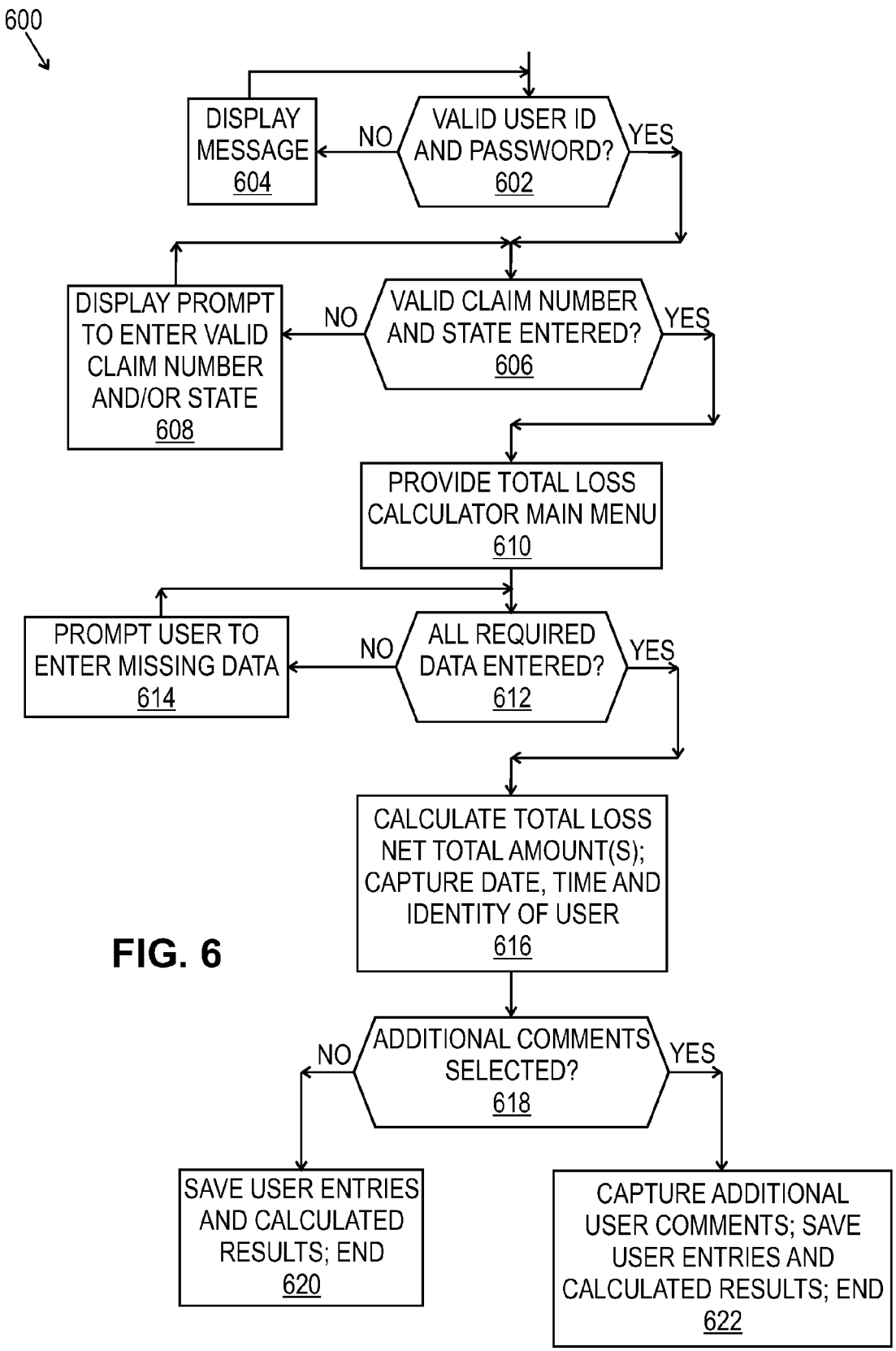
FIG. 6 is a flow chart that illustrates a total loss process that may be performed in accordance with aspects of the present invention by the computer depicted in FIG. 3.

FIG. 6 is a flowchart that illustrates a total loss calculation process 600 that may be performed in accordance with aspects described herein, and that may be performed by the total loss engine computer 300 of FIG. 3. In step 602, if the user enters an invalid User ID and/or Password, then a message is displayed 604 for the user that states: "Invalid User ID and/or Password; Please try again". In some embodiments, a prompt to re-enter the User ID and Password then appears, and if difficulty logging on to the Total Loss system continues another message to "See your Supervisor" may appear (for example, if the user attempts to enter her User ID and/or password more than twice then one or more additional messages may be displayed. Furthermore, in some embodiments access to the total loss application may be denied to a user whose login attempts fail, for example, three times). If a valid User ID and password are entered in step 602, then a prompt may be displayed for the user to enter a Claim number and to select a State. In step 606, if the user enters an invalid Claim number and/or does not select a State, then a prompt or message is displayed 608 for the user that states: "Invalid Claim Number; Please try again" and/or "Please select State". When the user enters 606 a valid Claim number and selects a State, then the system provides 610 a total loss calculator main menu 400 (FIG. 4A) that the user can use to enter data concerning the totaled vehicle claim, as explained above with regard to FIGS. 4A to 4C. When the user Calculate button 430 (FIG. 4A) is selected by the user, the total loss application checks 612 to make sure that all the required data has been entered. If not, then a prompt is displayed 614 to the user requesting the missing data (wherein the prompt message depends on the data that is missing). It should be understood that, with regard to the prompts and/or messages displayed to a user with regard to steps 604, 608 and 614, the process may idle for a predetermined amount of time to allow the user to supply the requested input(s). If the user fails to enter the requested input(s) before the predetermined amount of time expires, then the process may terminate and revert back to step 602 to again display the total loss calculator main menu 400 without saving any of the data input up to that point. In such a case, a pop-up message may appear in a dialog box, for example, warning the user that he or she must enter the requested data within a preset time limit or the process will end.

Referring again to FIG. 6, once all the required data is entered 612, the process includes calculating 616 the total loss net amount(s), and capturing the date, time and identity of the user. If the additional comments link is not selected 618, then the user entries and total loss calculated results for that claim number are saved 620 and the process ends. If the additional comments link is selected 618 by the user, then the additional comments input by the user are captured 622, the user entries and total loss calculated results for that claim number are saved and the process ends. In some embodiments, the user may have the option to click on a Clear button 432 (FIG. 4A) to erase all of the entries and calculations performed before clicking on the Calculate button 430, which functions to reset the data entry fields of the total loss calculator main screen.

Figure 7:
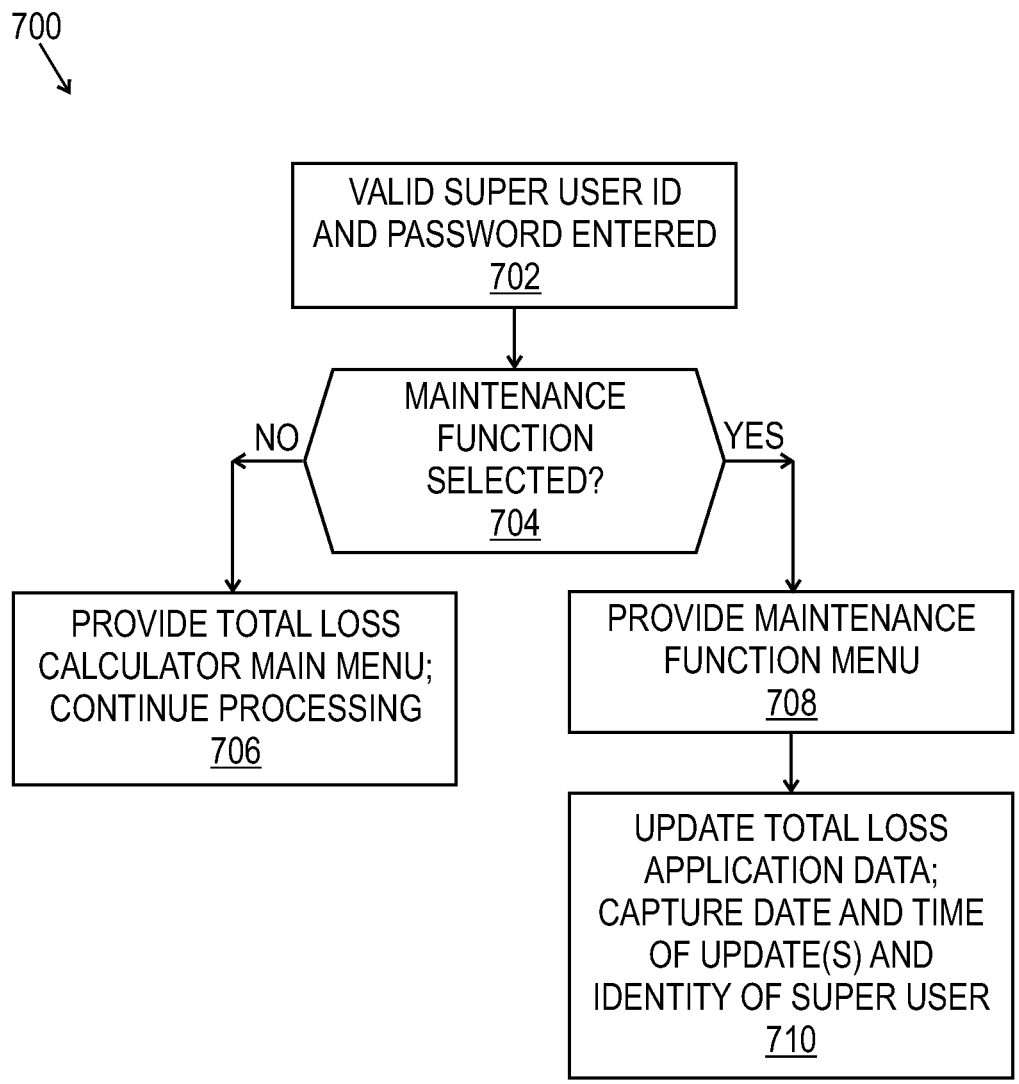
FIG. 7 is a flow chart that illustrates a total loss maintenance process according to aspects of the invention that may be performed by the computer depicted in FIG. 3.

FIG. 7 is a flow chart that illustrates a total loss maintenance process 700 according to aspects described herein that may be performed by the total loss engine computer 300 of FIG. 3. In step 702, a valid Super User ID and Password are entered into the total loss application login screen (not shown). If a maintenance function is not selected 704 (for example, within a predetermined amount of time) or if the Super User selects a "total loss calculator" link (not shown), then a total loss calculator main menu 400 is provided 706 to the Super User, and processing continues as described above with regard to FIG. 6. If a maintenance function is selected 704, then a maintenance function menu is provided 708 for the Super User to select which type of maintenance he or she wishes to perform. For example, the selections provided by the maintenance function menu may permit the Super User to access one or more of the "Total Loss Calculator" menus discussed above with regard to FIGS. 5A to 5E for updating and/or for changing such information as total loss State guideline and tax data, and/or user profile data. When the Super User is finished with his or her updates, he or she will click on a Save button (fore example, save button 522 of FIG. 5A) so that the total loss system will update 710 the data and the date and time of the updates, as well as the identity of the Super User will be captured. In some embodiments, the Super User may then be prompted to select another maintenance function or to log off the system.

Figure 8:
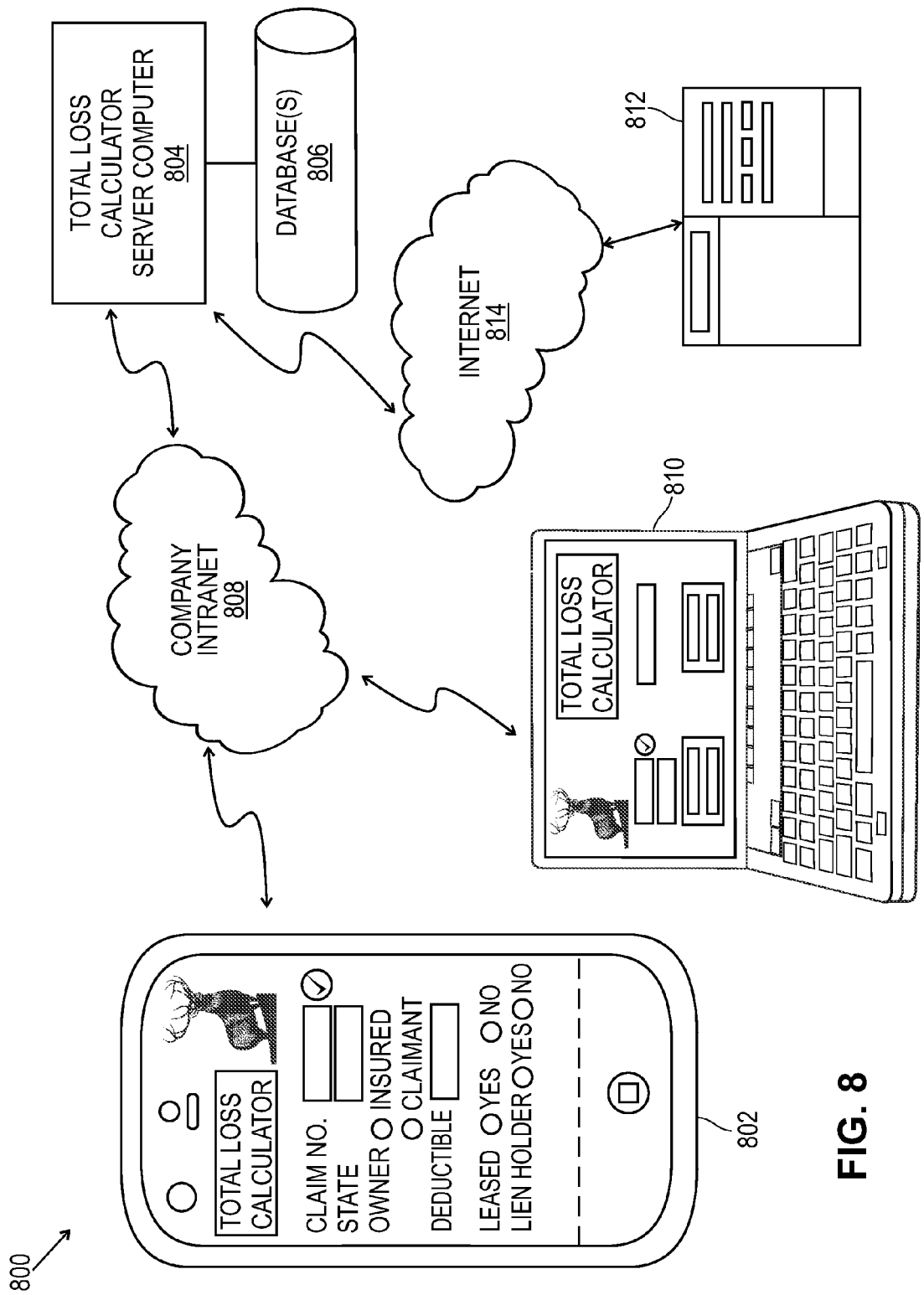
FIG. 8 is a block diagram representation of a total loss calculator system in accordance with further aspects of the invention.

FIG. 8 is a block diagram representation of a system 800 in accordance with further aspects described herein. In particular, a first user having a handheld device 802 and a second user having a laptop computer 810 are shown accessing the total loss calculator server computer 804 via a company intranet 808. The company intranet 808 may be a private network configured to permit secure sharing of company information. The total loss calculator server computer 804 may be operatively connected to one or more databases 806, and may be configured for wired or wireless communications via the company intranet 808 to a plurality of user devices. (In some embodiments, the intranet 808 may include connections to the internet 814 through one or more gateway computers having firewalls (not shown), so that company security is maintained.) In the example shown in FIG. 8, the first and second users may be employees of the insurance company, and thus may be required to login to an insurance company server computer (or to the total loss calculator server computer 804), for example, to gain passage through a company firewall and/or other company security measures that protect the company intranet 808 from entry by unauthorized users. The total loss calculator server computer 804 may also communicate with one or more third party vendor computer networks 812 (or server computers and the like) via the internet 814 (or some other network), in order to access information as described herein. It should be understood that other wired and/or wireless network connections could be utilized between users and the total loss server computer, and between any vendors and the total loss server computer. In addition, it should be understood that users and/or vendors can utilize many different types of devices, including portable devices, to access or communicate with the total loss application, such as desktop computers, cell phones, personal digital assistants (PDAs), portable music players (such as an iPod™), and tablet computers.

In some embodiments, claim data from all users is saved into a database along with identification data and timestamps so as to provide an audit trail. In addition, in some implementations, management reports can be generated that may depend on attributes or characteristics associated with or designated by the insurance company. For example, management reports that include data concerning claims opened and/or completed by users of a particular claims center could be provided on demand to predefined types of users (for example, to Super Users).

The total loss calculator application may be, in some embodiments, integrated directly with an information systems technology department suite of software programs, to provide easy access to users of multiple applications. In addition, data input and/or generated by users of the total loss application may be updated in a central database, such as a claim data warehouse. In some implementations, when the user inputs "additional comments" concerning a particular claim number, those comments will be automatically saved and/or updated in with a copy of that total loss claim. Also, some implementations include the feature of automatically updating the comparative negligence field from a central database.

Figure 9:
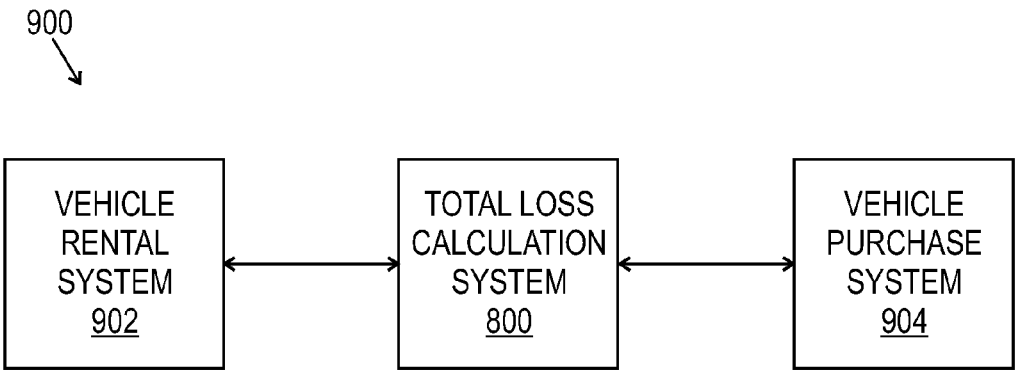
FIG. 9 is a block diagram representation of a total loss calculator and replacement vehicle system in accordance with yet other aspects of the invention.

FIG. 9 is a block diagram depicting an embodiment of a total loss calculator and replacement vehicle system 900 in accordance with another aspect. For example, a user (such as a claims adjuster) of the total loss calculator system 800 (shown in FIG. 8) may be provided with access to a vehicle rental system 902 and/or access to a vehicle purchase system 904. The vehicle rental system 902 may include, for example, a server computer (not shown) hosting a web-based vehicle rental application that can be accessed by the claims adjuster.

In some embodiments, the vehicle rental application may be operable to obtain data and/or information from one or more rental companies or other rental car data sources, for example, in the same State and/or county and/or region as the owner of the totaled vehicle. In particular, when the claims adjuster accesses the vehicle rental system, he or she may be presented with at least one menu that includes tools for determining an estimate of a fair amount of days and/or of a fair price that the insurance company is willing to pay to enable the owner of the totaled vehicle to rent a car (a temporary replacement vehicle) until a replacement vehicle can be purchased. For example, in a particular State and/or county, the owner of the totaled vehicle may be entitled to receive an insurance company payment of $25.00 per day for five (5) consecutive days to be applied to a rental car. This enables the owner of the totaled vehicle to, for example, commute to and from work and/or to run errands while also giving him or her some time to select and purchase a replacement vehicle.

Referring again to FIG. 9, the vehicle purchase system 904 may include, for example, a server computer (not shown) hosting a web-based vehicle purchase application. The vehicle purchase application may be accessible by the claims adjuster and/or by the owner of the totaled vehicle to find new and/or used vehicles offered for purchase from, for example, certified dealers. In some embodiments, the certified dealers may be located in the same State and/or county as the owner of the totaled vehicle. The vehicle purchase application may provide one or more menus for selecting, for example, the make and model of particular cars, a year range, a body type, a price range, a mileage range, and the distance to one or more dealers from the zip code of the residence of the owner of the totaled vehicle. The claims adjuster (and/or the totaled vehicle owner) can access the vehicle purchase system to perform one or more searches to obtain information concerning available new and/or used cars of a type having characteristics that match those desired by the owner of the totaled vehicle. For example, the owner of the totaled vehicle may desire to purchase a used, late-model coupe (in the year range of 2004-2009) that costs less than $10,000 dollars (perhaps because the total loss calculation was for approximately that amount of money). The claims adjuster enters these selections in the menu of the vehicle purchase application and performs a search that may result in several vehicle options for presentation to the owner of the totaled vehicle. The vehicle options may fit criteria of the owner of the totaled vehicle, and may be presented to him or her at the same time as the total loss calculation amount. In some embodiments, the vehicle purchase application may also include a financing function that can be used by the owner of the totaled vehicle to apply for a car loan from a participating bank and/or finance company.

Accordingly, the total loss calculator and replacement vehicle system 900 provides a complete total loss solution for an owner of a totaled vehicle because that owner can be presented with rental vehicle and replacement vehicle options at the same time as the total loss calculation amount. In addition, the replacement vehicle options can be tailored to closely match the amount of money being offered to the owner of the totaled vehicle, and/or to closely match the vehicle characteristics desired by the owner of the totaled vehicle.

The described processes and systems advantageously improve insurance claims adjuster (employee) response times resulting in increased productivity. Providing such a total loss calculator application for users also insures universal use (for example, by insurance company employees), improves data accuracy and integrity, provides regulatory protection (as long as the data, such as State tax data, is kept up-to-date), and simplifies database maintenance tasks. In addition, business benefits such as improved total loss calculation performance, improved accessibility of the total loss application to employees, improved efficiency and improved security protection result. Monetary benefits are also realized, including overall reduced costs and reduced fees and fines due to inadvertent State Tax and/or State regulations avoidance. Moreover, insurance customer satisfaction may be increased when a claims adjuster, for example, provides the owner of a totaled vehicle with a total loss solution by presenting rental vehicle and replacement vehicle options at the same time as the total loss calculation.

The process descriptions and flow charts contained herein should not be considered to imply a fixed order for performing process steps. Thus, process steps may instead be performed in any order that is practicable.

The present invention has been described in terms of several embodiments solely for the purpose of illustration. Persons skilled in the art will recognize from the descriptions that the invention is not limited to the embodiments described, but may be practiced with modifications and alterations limited only by the spirit and scope of the appended claims.

What is claimed is:

1. A system for generating a calculator interface including displays for conducting comprehensive integrated calculations including accessing third party computer systems for a plurality of data items, comprising:

a calculator interface server computer configured to:
provide, by a communications device via a data network to a user device, a total loss calculator graphical interface including an enabled claim identification input field a validation button selectable to cause validation of the claim identification input, a disabled state selection input field, and a disabled state guidelines viewer;
responsive to receipt, from the user device via the data network by the communications device, of the claim identification input and selection of the validation button, validate the claim identification input for a claim corresponding to a vehicle that has been totaled;
responsive to positive validation of the claim identification input, enable, by the communications device via the data network to the user device, the state selection input field for the total loss calculator graphical interface and disable the claim identification input field;
responsive to receipt of the state selection input:
enable, by the communications device via the data network to the user device, the state guidelines viewer for the total loss calculator graphical interface, said state guidelines viewer corresponding to the state selection input and including selectable state specific information for viewing; and
request, by the communications device via the data network from a state jurisdictional computer, state jurisdictional data and state cost data for the totaled vehicle;
provide by the communications device via the data network to the user device, a calculate button on the total loss calculator graphical interface, said calculate button being selectable to cause calculation of a total loss amount based on the state jurisdictional data, the state cost data, and data entered by the user in the total loss calculator graphical interface;
responsive to receipt of selection of the calculate button, determine whether all required data to calculate the total loss amount has been received;

responsive to a positive determination that all of the required data to calculate the total loss amount has been received:
calculate a net total amount for the totaled vehicle including a first net total amount in a case where an insuring entity obtains the vehicle and a second net total amount in a case where an owner retains the vehicle, the first and second net total amounts calculated based on application of a plurality of fee rules associated with the state jurisdictional data, the state cost data, and said state selection input; and
provide by the communications device via the data network to the user device, a display on a first portion of the total loss calculator graphical interface of the first net total amount corresponding to the case where the insuring entity obtains the vehicle and a display on a second portion of the total loss calculator graphical interface of the second net total amount corresponding to the case where the owner retains the vehicle.

2. The computer system of claim 1, wherein the calculator interface server computer is further configured to, responsive to a negative determination that all of the required data to calculate the total loss amount has been received, provide a display on the total loss calculator graphical interface indicating the additional data needed.

3. The computer system of claim 1, wherein the calculator interface server computer being configured to request state cost data comprises the memory storing instructions operative with the one or more computer processors to:
transmit, by the communications device via the data network, the state selection input and a request for the state cost data to a third party state cost computer of a third party source of cost data; and
receive, by the communications device via the data network from the third party state cost computer, the state cost data.

4. The computer system of claim 1, wherein the calculator interface server computer being configured to request state jurisdictional data comprises the memory storing instructions operative with the one or more computer processors to:
transmit, by the communications device via the data network, the state selection input and a request for the state jurisdictional data to a third party jurisdictional computer of a third party source of jurisdictional data; and
receive, by the communications device via the data network from the third party jurisdictional computer, the state jurisdictional data.

5. The computer system of claim 1, wherein the calculator interface server computer is further configured to:
transmit, by the communications device via the data network, a request for vehicle value data for the vehicle that has been totaled to a third party vehicle value computer of a third party source of vehicle value data; and
receive, by the communications device via the data network from the third party vehicle value computer, the vehicle value data for the vehicle that has been totaled;
wherein the first and second net total amounts are further based on the received vehicle value data for the vehicle that has been totaled.

6. The computer system of claim 1, wherein the calculator interface server computer is further configured to:
responsive to a positive determination that all of the required data to calculated the total loss amount has been received, transmit, by the communications device via the data network, the state selection input to a vehicle rental computer for determination of one or both of an estimate of a number of days and a price that the insuring entity will pay for rental of a rental vehicle by the owner of the totaled vehicle.

7. The computer system of claim 1, further comprising one or more data storage devices storing user data including first user type identifiers and passwords and second user type identifiers and passwords, and wherein the calculator interface server computer is further configured to, prior to providing to the user device for display the total loss calculator graphical interface:
receive, by the communications device, a user identifier and password;
determine whether the received user identifier and password correspond to one of a first user type identifier and password and a second user type identifier and password stored in the one or more data storage devices;
responsive to a determination that the user identifier and the password correspond to a first user type identifier and password, output to the user device data for display the total loss calculator graphical interface; and
responsive to a determination that the user identifier and the password correspond to a second user type identifier and password, output to the user device a display of selectable maintenance menus on the total loss calculator graphical interface.

8. The computer system of claim 7, wherein the calculator interface server computer is further configured to:
responsive to receipt of a selection of one of the maintenance menus from the user device:
output, by the communications device to the user device, a display of the selected maintenance menu; and
update the total loss calculator graphical interface based on input to the selected maintenance menu and capture at least one of a date of input entry, a time of input entry, and an identity of the user of the second user type.

9. The computer system of claim 8, wherein the calculator interface server computer being configured to provide, to the user device, the display of the selected maintenance menu comprises the calculator interface server computer being configured to provide to the user device data a display of at least one of a maintain state guidelines menu, a maintain fees menu, a maintain fee rules menu, and an update user menu.

10. The computer system of claim 1, wherein the calculator interface server computer is further configured to provide to the user device for display, by the communications device, a vehicle replacement interface through the total loss calculator graphical interface.

11. The computer system of claim 1, wherein the calculator interface computer server is further configured to provide, by the communications device via the data network to the user device and responsive to receipt of the state selection input, a state specific calculator accessible via the state guidelines view of the total loss calculator graphical interface, said state specific calculator corresponding to the state selection input.

12. The computer system of claim 1, wherein the state specific calculator accessible via the state guidelines view of the total loss calculator graphical interface comprises a state specific calculator for calculating an unused registration amount corresponding to the totaled vehicle.

13. A method for determining and displaying integrated calculations on a configurable user interface including accessing third party computer systems for a plurality of data items, comprising:
providing, by a calculator interface server computer by a communications device of the calculator interface server computer, via a data network to a user device, a total loss calculator graphical interface including an enabled claim identification input field a validation button selectable to cause validation of the claim identification input, a disabled state selection input field, and a disabled state guidelines viewer;

responsive to receiving from the user device via the data network, by the communications device, of the claim identification input and selection of the validation button, validate, by the calculator interface server computer, the claim identification input for a claim corresponding to a vehicle that has been totaled;

responsive to positive validation of the claim identification input, enabling, by the communications device of the calculator interface server computer via the data network to the user device, the state selection input field for the total loss calculator graphical interface;

responsive to receipt of the state selection input:
enabling, by the communications device of the calculator interface server computer via the data network, a state guidelines viewer for the total loss calculator graphical interface on the user device, said state guidelines viewer corresponding to the state selection input and including selectable state specific information for viewing; and
requesting, by the communications device of the calculator interface server computer via the data network from a state jurisdictional computer, state jurisdictional data and state cost data for the totaled vehicle;

providing, by the communications device of the calculator interface server computer via the data network to the user device, a calculate button on the total loss calculator graphical interface, said calculate button being selectable to cause calculation of a total loss amount based on the state jurisdictional data, the state cost data, and data input by the user into the total loss calculator graphical interface;

responsive to receipt of selection of the calculate button, determining, by the calculator interface server computer, whether all required data to calculate the total loss amount has been received;

responsive to a positive determination that all of the required data to calculated the total loss amount has been received:
calculating, by the calculator interface server computer, a net total amount for the totaled vehicle including a first net total amount in a case where an insuring entity obtains the vehicle and a second net total amount in a case where an owner retains the vehicle, the first and second net total amounts calculated based on an application of a plurality of fee rules associated with the state jurisdictional data, the state cost data, and said state selection input; and
providing, by the communications device of the calculator interface server computer via the data network to the user device, a display on a first portion of the total loss calculator graphical interface of the first net total amount corresponding to the case where the insuring entity obtains the vehicle and a display on a second portion of the total loss calculator graphical interface of the second net total amount corresponding to the case where the owner retains the vehicle; and
transmitting, by the communications device of the calculator interface server computer via the data network, the state selection input to a vehicle rental computer for determination of one or both of an estimate of a number of days and a price for payment by the insuring entity for rental of a rental vehicle by the owner of the totaled vehicle.

14. The method of claim 13, further comprising, responsive to a negative determination that all of the required data to calculate the total loss amount has been received, providing, by the communications device of the calculator interface server computer via the data network, a display on the total loss calculator graphical interface of the user device indicating the additional data needed.

15. The method of claim 13, wherein requesting state cost data comprises:
transmitting, by the communications device of the calculator interface server computer via the data network, the state selection input and a request for the state cost data to a third party state cost computer of a third party source of cost data; and
receiving, by the communications device of the calculator interface server computer via the data network from the third party state cost computer, the state cost data.

16. The method of claim 13, wherein requesting state jurisdictional data comprises:
transmitting, by the communications device of the calculator interface server computer via the data network, the state selection input and a request for the state jurisdictional data to a third party jurisdictional computer of a third party source of jurisdictional data; and
receiving, by the communications device of the calculator interface server computer via the data network from the third party jurisdictional computer, the state jurisdictional data.

17. The method of claim 13, further comprising:
transmitting, by the communications device of the calculator interface server computer via the data network, a request for vehicle value data for the vehicle that has been totaled to a third party vehicle value computer of a third party source of vehicle value data; and
receiving, by the communications device of the calculator interface server computer via the data network from the third party vehicle value computer, the vehicle value data for the vehicle that has been totaled;
wherein the first and second net total amounts are further based on the received vehicle value data for the vehicle that has been totaled.

18. The method of claim 13, further comprising, prior to providing to the user device for display the total loss calculator graphical interface:
receiving, by the communications device of the calculator interface server computer via the data network from the user device, a user identifier and password;
determining, by the calculator interface server computer, whether the received user identifier and password correspond to one of a first user type identifier and password and a second user type identifier and password stored in the one or more data storage devices;
responsive to a determination that the user identifier and the password correspond to a first user type identifier and password, outputting, by the communications device of the calculator interface server computer via the data network to the user device, for display on the user device, the total loss calculator graphical interface; and
responsive to a determination that the user identified and the password correspond to a second user type identifier and password, outputting, by the communications device of the calculator interface server computer via the data network to the user device, for display on the user device, maintenance menus of the total loss calculator graphical interface.

19. The method of claim 18, further comprising, responsive to a determination that the user identified and the password correspond to a second user type identifier and password:
- receiving, by the communications device of the calculator interface server computer via the data network from the user device, a selection of one of the maintenance menus;
- outputting, by the communications device of the calculator interface server computer via the data network to the user device, for display on the user device, the selected maintenance menu, wherein the selected maintenance menu includes at least one of a data input field and a checkbox;
- receiving, by the communications device of the calculator interface server computer via the data network from the user device, at least one of data input into the data input field and a checkbox selection;
- updating, by the calculator interface server computer, the total loss calculator graphical interface based on the at least one of the data input and the checkbox selection; and
- capturing, by the calculator interface server computer, at least one of a date of input entry, a time of input entry, and an identity of the user of the second user type.

20. A system for determining and displaying integrated calculations on a configurable user interface including accessing third party computer systems for a plurality of data items, comprising:
- a calculator interface loss computer server configured to:
  - provide, by a communications device via a data network to a user device, a total loss calculator graphical interface including an enabled claim identification input field, a validation button selectable to cause validation of the claim identification input, a disabled state selection input field, and a disabled state guidelines viewer on the main menu;
  - responsive to receipt, from the user device via the data network by the communications device, of the claim identification input and selection of the validation button, validate the claim identification input for a claim corresponding to a vehicle that has been totaled;
  - responsive to receipt of the state selection input:
    - enable, by the communications device via the data network to the user device, the state guidelines viewer for the total loss calculator graphical interface, said state guidelines viewer corresponding to the state selection input and including selectable state specific information for viewing; and
    - request, by the communications device via the data network from a state jurisdictional computer, state jurisdictional data and state cost data for the totaled vehicle;
  - provide by the communications device via the data network to the user device, a calculate button on the total loss calculator graphical interface, said calculate button being selectable to cause calculation of a total loss amount based on the state jurisdictional data, the state cost data, and data entered by the user in the total loss calculator graphical interface;
  - responsive to receipt of selection of the calculate button, determine whether all required data to calculate the total loss amount has been received;
  - responsive to a negative determination that all of the required data to calculate the total loss amount has been received, provide an indication of additional data needed on the total loss calculator graphical interface; and
  - responsive to an affirmative determination that all the required data has been received:
    - calculate a net total amount for the totaled vehicle including a first net total amount in a case where an insuring entity obtains the vehicle and a second net total amount in a case where an owner retains the vehicle, the first and second net total amounts calculated based on application of a plurality of fee rules associated with the state jurisdictional data, the state cost data, and said state selection input; and
    - provide by the communications device via the data network to the user device, a display on a first portion of the total loss calculator graphical interface of the first net total amount corresponding to the case where the insuring entity obtains the vehicle and a display on a second portion of the total loss calculator graphical interface of the second net total amount corresponding to the case where the owner retains the vehicle.

21. The computer system of claim 20, wherein the calculator interface server computer being configured to request the state jurisdictional data and the state cost data for the totaled vehicle comprises the calculator interface server computer being configured to:
- transmit, by the communications device via the data network, the state selection input and a request for the state jurisdictional data to a third party jurisdictional computer of a third party source of jurisdictional data;
- receive, by the communications device via the data network from the third party jurisdictional computer, the state jurisdictional data;
- transmit, by the communications device via the data network, the state selection input and a request for the state cost data to a third party state cost computer of a third party source of cost data; and
- receive, by the communications device via the data network from the third party state cost computer, the state cost data.

22. The computer system of claim 20, further comprising a vehicle rental computer in communication with the communications device of the computer system via the data network, the vehicle rental computer being configured to receive the state selection input data, and responsive to receipt of the state selection input data, determine one or both of an estimate of a number of days and a price that the insuring entity will pay for rental of a rental vehicle by the owner of the totaled vehicle.

23. The computer system of claim 22, further comprising a vehicle purchase computer in communication with the calculator interface server computer via the communications device and the data network, the vehicle purchase computer configured to provide a user with a search interface to obtain new and used vehicle data for a vehicle to be purchased.

\* \* \* \* \*